United States Patent [19]

Schaffner et al.

[11] 4,083,611
[45] Apr. 11, 1978

[54] MASTER LINK ASSEMBLY FOR CRAWLER TRACTOR TRACK ASSEMBLY

[75] Inventors: Donald L. Schaffner; James L. Miller, both of Springfield, Ill.

[73] Assignee: Fiat-Allis Construction Machinery, Inc., Deerfield, Ill.

[21] Appl. No.: 688,281

[22] Filed: May 20, 1976

Related U.S. Application Data

[63] Continuation of Ser. No. 543,353, Jan. 23, 1975, abandoned.

[51] Int. Cl.² .............................................. B62D 55/20
[52] U.S. Cl. .................................... 305/54; 305/58 R
[58] Field of Search .................. 305/58 R, 39, 54, 45; 74/254, 258; 403/331

[56] References Cited

U.S. PATENT DOCUMENTS

| 2,882,102 | 4/1959 | Rund | 305/58 X |
| 3,822,923 | 7/1974 | Stedman | 305/58 |

FOREIGN PATENT DOCUMENTS

| 2,038,144 | 2/1972 | Germany | 305/58 |

Primary Examiner—Robert B. Reeves
Assistant Examiner—John P. Shannon
Attorney, Agent, or Firm—Thomas F. Kirby; Robert A. Brown; Harvey W. Rockwell

[57] ABSTRACT

A master link assembly in a continuous flexible track assembly for a crawler tractor comprises two laterally spaced apart (left and right) parallel master links and each master link comprises two overlapping half-links held in alignment by a pin extending into registering pin holes in the half-links. The overlapping half-links are mechanically secured together in fixed relationship by track shoe capscrews which extend through holes in a master link track shoe which overlies both half-links and screw into tapped capscrew holes in the half-links. Besides aligning the overlapping half-links, each pin also serves as a safety connection in case the capscrews break and also enables removal of the capscrews and replacement of the track shoe without breaking the track assembly. Axial displacement of a pin from its pin holes is prevented by arranging at least one tapped screw hole in each half-link so that a capscrew, when fully inserted therein, engages a groove in the side of the pin and prevents axial movement of the pin.

13 Claims, 7 Drawing Figures

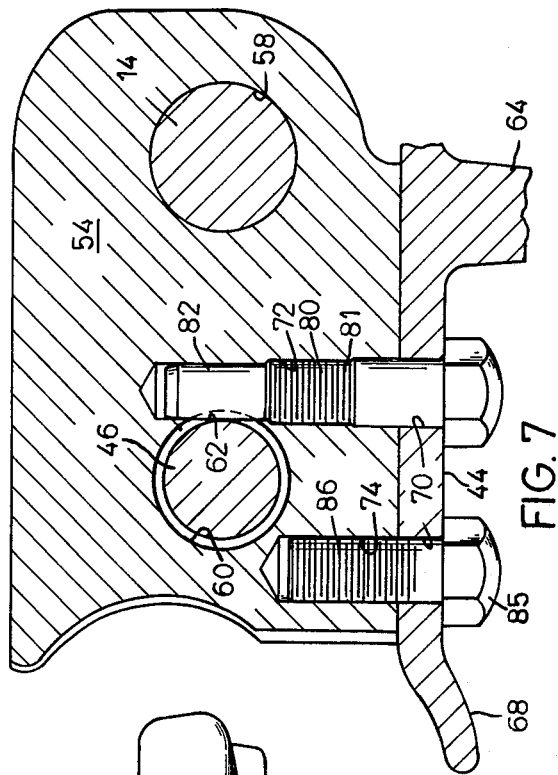
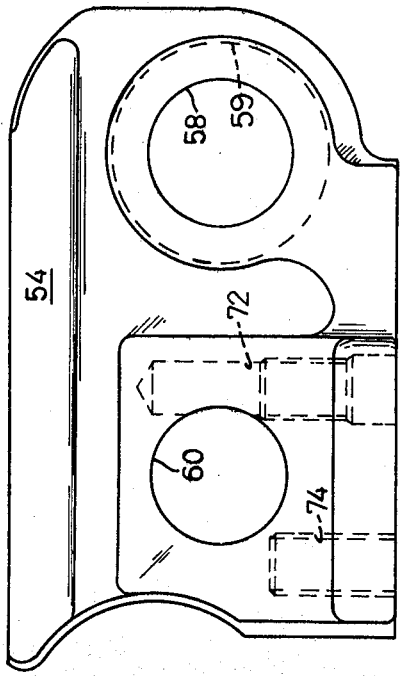
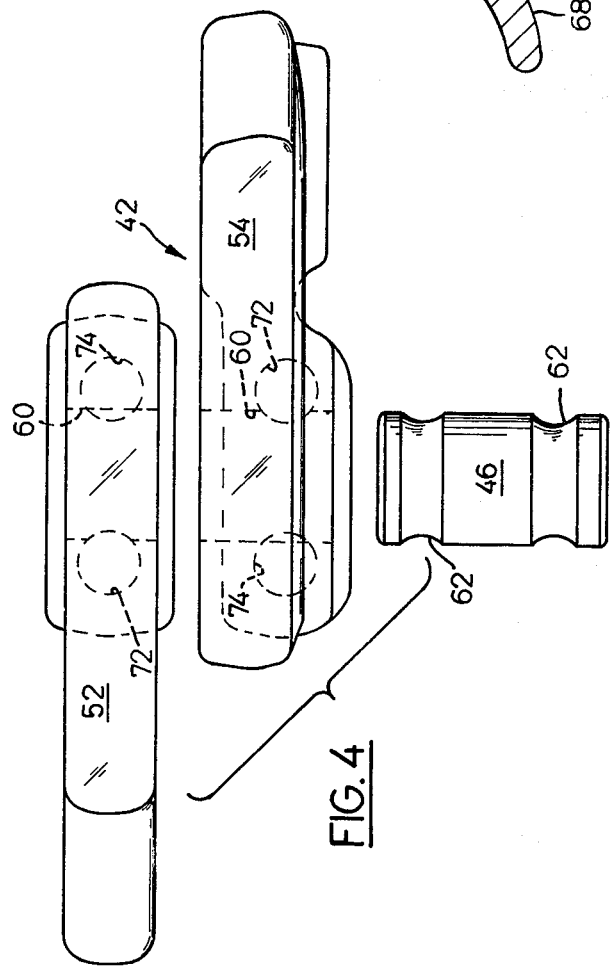
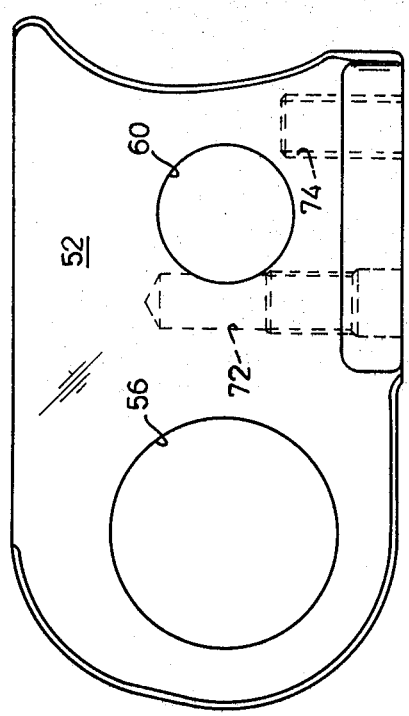

MASTER LINK ASSEMBLY FOR CRAWLER TRACTOR TRACK ASSEMBLY

REFERENCE TO RELATED CO-PENDING APPLICATION

This is a continuation application from U.S. Ser. No. 543,353, filed Jan. 23, 1975, now abandoned.

BACKGROUND OF THE INVENTION

1. Field of Use

This invention relates generally to crawler tractor track assemblies and particularly to master links therefor.

2. Description of the Prior Art

A track assembly for a crawler tractor typically comprises a plurality of articulately connected link assemblies, with a track shoe attached to each and with adjacent link assemblies being connected together by pins and bushings. Normally, at least one link assembly is constructed to serve as a separable or detachable master link assembly to enable the track assembly to be mounted on or removed from the tractor. The prior art teaches a wide variety of such master link assemblies, and U.S. Pat. No. 2,882,102 teaches a master link assembly comprising two laterally spaced apart (right and left) links and each link comprises two separable parts having mating faces and detachable means to hold the two parts of the link together. In some prior art arrangements the two separable link sections forming a link have interlocking serrations on their mating surfaces and the sections are directly joined together by capscrews. However, if the capscrews break, the link separates.

SUMMARY OF THE PRESENT INVENTION

In accordance with the present invention there is provided a continuous flexible articulated track assembly for a crawler tractor which comprises a plurality of interconnected link assemblies. Each link assembly comprises a pair of laterally spaced apart (right and left) parallel links which are interconnected at one end by a hollow cylindrical transverse track bushing and which are interconnected at the other end by a cylindrical transverse track pin which extends through the track bushing of the next adjacent link assembly. The ends of the track bushing and the ends of the track pin are press-fitted in holes in the links. The track pin is relatively oscillatable with respect to the track bushing wherein it is inserted so as to reduce friction and facilitate assembly and disassembly of the track. One such link assembly serves as a master link assembly which enables the track assembly to be broken so that it can be mounted on or removed from the tractor. The master link assembly comprises two laterally spaced apart (left and right) parallel master links, a master track shoe, track shoe capscrews, and short pins. Each master link comprises two overlapped half-links and each half-link has an aperture for receiving (in press-fit) either the end of a hollow cylindrical bushing or a cylindrical track pin and a pin hole. A pin is inserted into the registering, pin holes in the two overlapping half-links to align the half-links for assembly. However, the overlapping half-links are mechanically secured together in fixed relationship by the track shoe capscrews, each of which extends through a hole in the track shoe which overlies both half-links and screws into a tapped capscrew hole extending inwardly from the edge of a half-link. At least one tapped capscrew hole in each half-link transversely intersects the pin hole therein and the pin is provided with an annular pin groove extending therearound. Thus, when a track shoe capscrew is fully inserted into the said one capscrew hole, it engages the pin groove and prevents axial displacement of the pin.

The pin not only serves to align the associated half-links during assembly, but also provides a fail-safe connection should the capscrews break. Furthermore, the pin, if left in place while the master track shoe capscrews are removed, allows the master track shoe to be replaced without breaking the track assembly. The pin can be removed, if necessary, without removing the master shoe or breaking the track, provided the capscrews that retain master track shoe and normally restrict movement of the pin are partially withdrawn. The pin has a degree of lateral movement, and therefore, carries only shear loads, whereas the master track shoe and the capscrew therefor bear the principal loads. By placing capscrews along each half-link, the design is more stable. A master link assembly in accordance with the invention requires only three different configurations of half-links per master link assembly, whereas some other prior art arrangements require four. In addition, a master link assembly in accordance with the invention employs the same type and size of hollow cylindrical track bushing, cylindrical track pin, and track shoe (except for bolt holes) as are used in the regular link assemblies of the track, instead of special parts, thereby effecting cost savings in manufacture and assembly. The wear surface of each half-link has a continuous uniform width which is an aid in heat treating. The track roller has no joint to roll over because the joint is parallel to direction of track assembly motion.

DRAWINGS

FIG. 4 is an exploded plan view of a portion of the master link assembly taken in the same direction as FIG. 2 and showing two overlapping half-links forming one of the master links and the pin therefor;

FIG. 5 is a view of one side of one half-link shown in FIG. 4;

FIG. 6 is a view of one side of the other half-link shown in FIG. 4; and

FIG. 7 is a cross section view of the half-link taken on line VII—VII of FIG. 2.

DESCRIPTION OF A PREFERRED EMBODIMENT

Figure 1:
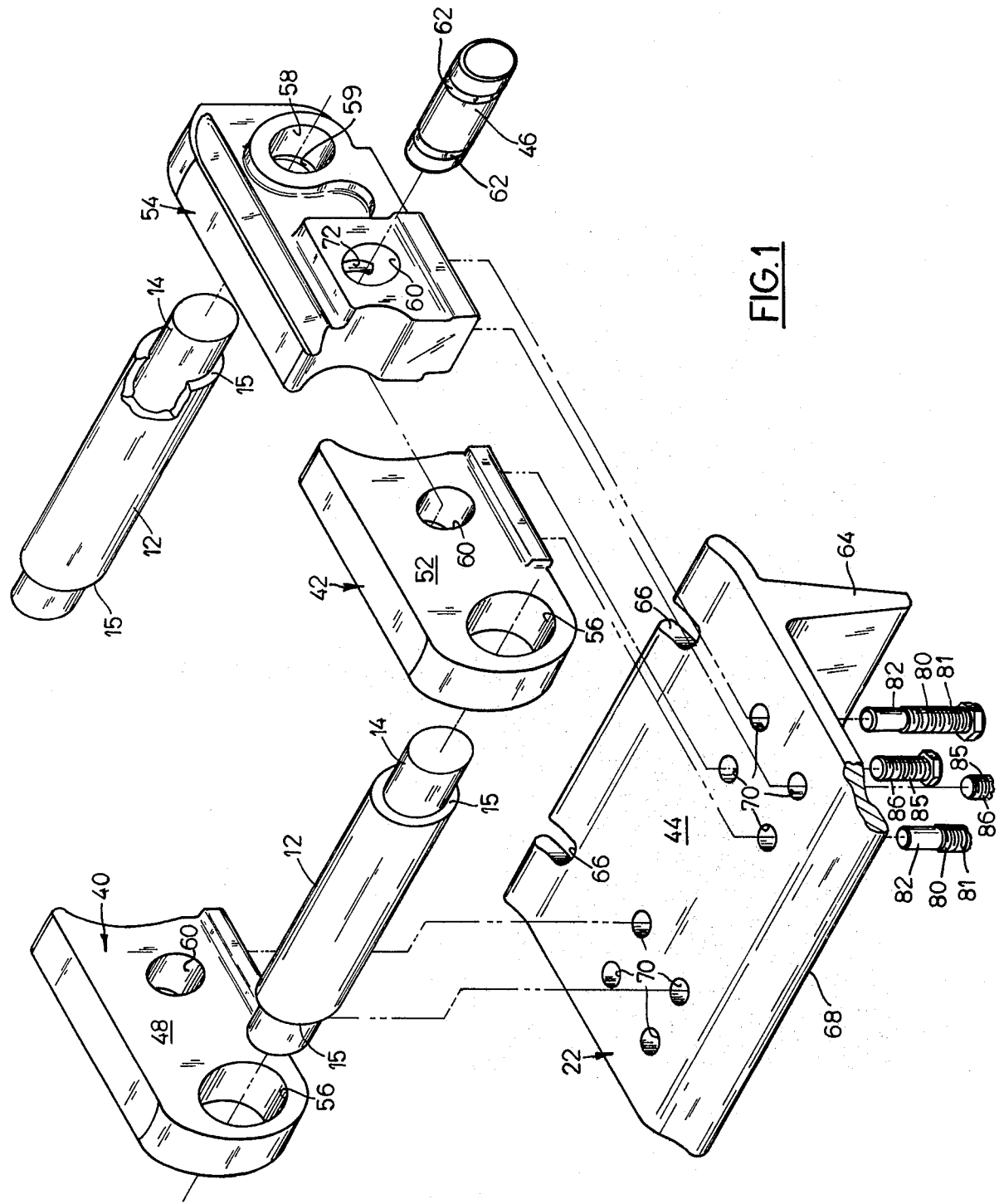
FIG. 1 is an exploded view of a master link assembly for a tractor assembly in accordance with the invention.
Figure 2:
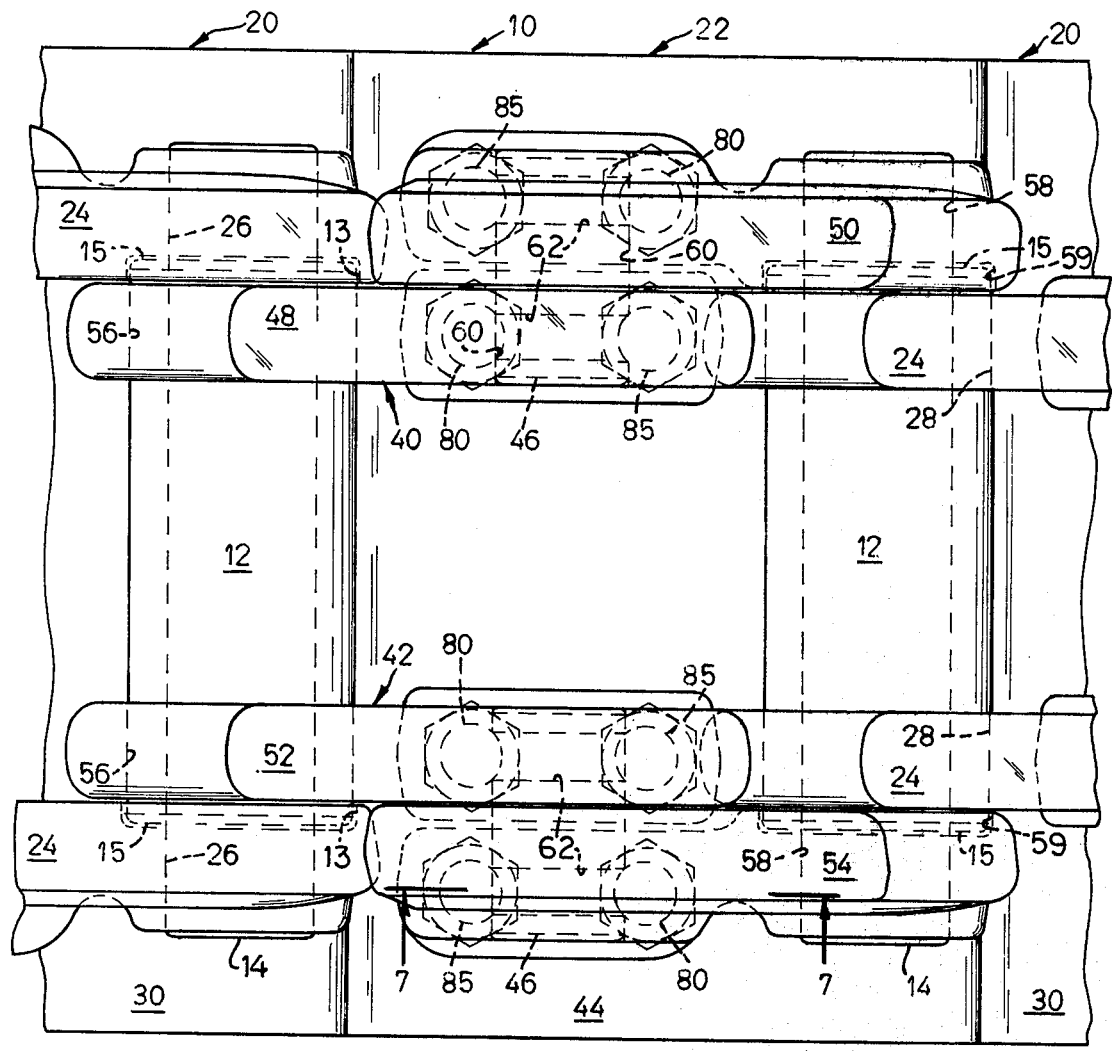
FIG. 2 is a plan view of the master link assembly shown in FIG. 1 and shows the inside thereof, namely, that side which would engage the track rollers of a tractor.
Figure 3:
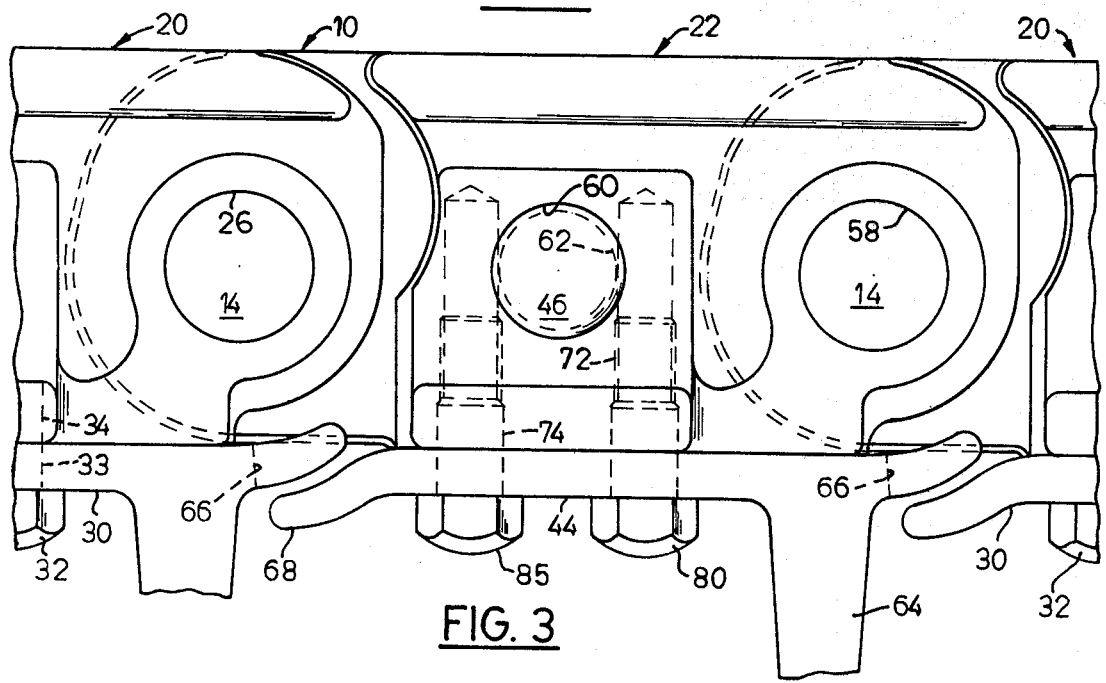
FIG. 3 is a side view of the master link assembly shown in FIGS. 1 and 2.

Referring to FIGS. 1, 2 and 3, there is shown a portion of a continuous flexible articulated track assembly 10 in accordance with the invention for use, for example, on a crawler tractor. Track assembly 10 comprises a plurality of regular interconnected track link assemblies such as 20 and one master link assembly or coupling link assembly 22 connected to and between an adjacent pair of regular track link assemblies 20. Master link assembly 22, hereinafter described in detail, enables track assembly 10 to be broken or separated so that it can be mounted on or removed from the tractor. Each regular track link assembly 20 comprises a pair of laterally spaced apart (right and left) parallel one-piece links 24 which are interconnected at one end by a hollow cylindrical transverse track bushing 12 and which are interconnected at the other end by a cylindrical transverse track pin 14 which extends through the hollow track bushing 12 of the next adjacent regular link assembly 20. The ends of the track bushing 12 and the ends of the track pin 14 are press-fitted in holes 28 and 26, respectively, in the links 24. The track bushings 12 and track pins 14 are arranged with their axes parallel to each other and normal to the direction of track travel. Each track pin 14 is relatively oscillatable with respect to the track bushing 12 wherein it is disposed so as to reduce friction and facilitate assembly and disassembly of track assembly 10. The opposite ends of the bushings 12 provide shoulders or surfaces 15 which properly space the links 24 associated with the track pin 14.

As FIGS. 2 and 3 show, each regular link assembly 20 comprises two laterally spaced apart parallel one-piece (right and left) links 24 which are identical to each other. Each link 24 comprises a bore 28 at one end for accommodating the end of a bushing 12 in a press fit and a bore 26 at its other end for accommodating the end of a track pin 14 in a press fit. Bore 26 is widened as at 13 to accommodate an outwardly projecting end portion of a bushing 12. Each regular link assembly 20 is provided with a track shoe 30 which is secured thereto by track shoe bolts or capscrews 32 which extend through holes 33 in the track shoe and screw into threaded holes 34 extending into a link 24 inwardly from an edge thereof.

Master link assembly 22, which is connected to and between an adjacent pair of regular track link assemblies 20, comprises two laterally spaced apart (right and left) parallel master links 40 and 42, a master track shoe 44, a plurality of (eight) shoe bolts or capscrews hereinafter particularly identified and described, and two short pins 46. Master link 40 comprises two half-links 48 and 50 and master link 42 comprises two half-links 52 and 54. The innermost half-links 48 and 52 are identical to each other and the outermost half-links 50 and 54 are similar but mirror images of each other; therefore, only three (instead of four) distinct types of half-links need to be fabricated.

The more closely spaced half-links 48 and 52 are each provided with a bore 56 for accommodating the end of a hollow cylindrical track bushing 12 in a press fit. The more widely spaced half-links 50 and 52 are each provided with a bore 58 for accommodating the end of a cylindrical track pin 14 in a press fit. Bore 58 is widened as at 59 to accommodate an outwardly projecting end portion of a bushing 12. Furthermore, each half-link 48, 50, 52, 54 is provided with a bore or pin receiving hole 60 for accommodating a pin 46. When two half-links forming a master link are properly overlapped and aligned, the pin holes 60 therein are in registry and capable of receiving a single pin 46 insertable therein. Thus, the pins 46 assure proper half-link alignment during assembly.

Each pin 46 is generally cylindrical in form and has chamfered ends to facilitate insertion. Furthermore, each pin 46 is provided with a pair of annular grooves 62 which extend around the pin and are located near opposite ends of the pin. Each groove 62 is adapted to be engaged by a track shoe capscrew to prevent axial displacement or accidental removal of the pin 46 from the pin holes 60, as hereinafter explained.

Each pair of overlapped half-links forming the master links 40 and 42 are mechanically secured together in fixed relationship by the master link track shoe 44 and the track shoe bolts or capscrews. As FIG. 1 best shows, track shoe 44 takes the form of a generally flat rigid plate having a ground-engaging lug 64 extending outwardly from the ground-engaging or outer surface of the plate. Track shoe 44 is further provided with notches, or indentations or cutouts 66 in one edge, which edge is transverse to the direction of track travel. The cutouts 66 are adapted to accommodate the links 24 of an adjacent track link assembly. Track shoe 44 is also provided with a projecting edge 68 opposite the said one edge. The forward and rear edges on track shoe 44 overlap the adjacent edges of the adjacent regular track shoes 30. Thus, track 10 presents a generally flat, uninterrupted but articulated ground engaging surface, as FIG. 2 best shows. It is to be understood that the regular track shoes 30 and master track shoe 44 are identical in general configuration and differ only in number and location of capscrew holes therein.

FIG. 1 further shows that master track shoe 44 is provided with an arrangement of bolt accommodating holes 70. Four holes 70 are grouped near each lateral edge of shoe 44 and two holes in each group are arranged in tandem so as to overlie the edge of each of the two half-links forming a link 40 or 42.

When track shoe 44 is arranged to properly overlie the two half-links forming a link, each hole 70 is aligned or in registry with a bolt receiving hole extending inwardly into a half-link from an edge thereof. As FIGS. 4, 5 and 6 best show, half-link 52 of link 42 is provided with an elongated bolt or screw receiving hole 74. Half-link 54 of link 52 is also provided with holes 72 and 74.

As FIG. 2 makes clear, the half-links 48 and 50 forming link 40 are also provided with holes 72 and 74. When the half-links 52 and 54 are overlapped, a hole 72 in one half-link is adjacent a hole 74 in the associated half-link. The holes 74 are threaded for substantially their entire length, whereas the holes 72 are threaded intermediately of the ends thereof. Thus, holes 72 and 74 are adapted to accommodate shoe bolts or capscrews of different types. For example, as FIGS. 1 and 7 show, each hole 72 is adapted to accommodate a relatively long shoe bolt or capscrew such as 80, which has a threaded portion 81 and an unthreaded portion 82. Each hole 72 accommodates a relatively short shoe bolt or capscrew such as 85 having a fully threaded shank 86. It is to be noted that each screw hole 72 intersects an edge of a pin-receiving hole 60. When a pin 46 is properly disposed in a pin hole 60, a groove 62 in the pin aligns with the intersecting portion of bolt hole 72, and, when a shoe bolt or capscrew is fully screwed into the hole, the capscrew engages the pin and prevents axial movement of the pin, thereby insuring that the pin stays in place. However, if the bolts in the holes 72 are partially unscrewed so that they clear an associated pin 46, the pin may be driven out and removed.

Master link assembly 22 is assembled in the following manner. Referring to FIG. 2, assume that the right hand regular link 20 has been previously assembled and right hand bushing 12 is inserted (press-fitted) through the bores 28 in the links 24 of the right hand regular link 30. The right hand pin 14 is then inserted through the axial bore or hole in hollow right hand bushing 12. It may also be assumed that the left hand bushing 12 was previously press-fitted through the bores 56 in the half-links 48 and 52 during initial assembly of track 10. Also, assume that left hand pin 14 is inserted in left hand bushing 12 and that links 24 are in place thereon.

When right hand pin 14 is properly positioned, the half-links 50 and 54 are placed on the ends thereof. Then, each pair of half-links forming a master link 40 or 42 are swung into overlapping aligned relationship and a pin 46 is driven or inserted into the aligned holes 60 of each pair of half-links. When both master links 40 and 42 are so pinned, the master track shoe 44 is placed so as to overlie both master links 40 and 42 and the pair of half-links comprising each master link. Track shoe 44 is then adjusted so that each hole 70 registers with an appropriate one of the holes 72 or 74 in the half-links, whereupon the shoe bolts or capscrews 80 and 85 are installed and tightened. As hereinbefore explained, each capscrew 80 or 85 extends through a hole 70 in the master track shoe 44 and screws into a tapped hole 72 or 74, respectively, in a half-link. The master link assembly 22 is thus fully assembled and the crawler track 10 is continuous.

When a track shoe capscrew 80 is fully inserted into a capscrew hole 72, it engages a pin groove 62 and prevents axial displacement of the pin 46.

The pin 46 not only serves to align its associated pair of half-links during assembly but also provides a fail safe connection should the capscrews break when the track is in motion. In particular, the removable pin 46 interconnecting a pair of half-links prevents relative longitudinal movement of the half-links in a direction transverse to the pin axis. Furthermore, the pin 46 allows the master shoe 44 to be replaced without breaking the track. A pin 46 can be removed if necessary without removing the master track shoe 44 or breaking the track, provided the two capscrews 80 that retain the master track shoe and normally restrict movement of the pin are partially withdrawn so as to be clear of the pin. Each pin 46 has a degree of lateral movement, and therefore, carries only shear loads, whereas the master track shoe 44, the half-links and the shoe bolts 80 and 86 bear the principal loads. By placing the capscrews 80 and 85 along each half-link, the design is more stable. A master link assembly 22 in accordance with the invention requires only three different configurations of half-links per link assembly, whereas some other prior art arrangements require four. Furthermore, the same type and size of track bushings, track pins and track shoes (except for capscrew holes therein) are employed in both the regular link assembly and the master link assembly. The wear surface of each half-link has a continuous uniform width which is an aid in heat treating. The track rollers 12 have no joint to roll over because the joint is parallel to direction of track motion.

We claim:

1. In a crawler track assembly: a plurality of track link assemblies, each track link assembly comprising at least one link and connecting means for articulately connecting adjacent track link assemblies, one of said track link assemblies being a master link assembly and comprising: at least one master link comprising a pair of overlapping half-links, said half-links overlapping along a plane, each half-link being articulately connected by connecting means to an adjacent track link assembly, a pin-engaging hole in each half-link, the pin-engaging holes being in registry with each other, a pin extending perpendicular to said plane and engageable with said pin-engaging holes in said half-links to effect alignment of said half-links, said pin having capscrew engaging means thereon, a master track shoe overlying said pair of half-links, each half-link having a capscrew hole in registry with a capscrew hole in said master track shoe, and capscrews for securing said master track shoe to said pair of half-links and connecting said pair of half-links in fixed relationship to each other and to said master track shoe, each capscrew being disposed in a capscrew hole in said master track shoe and a registering capscrew hole in half-link, at least one of said capscrews being engaged with said capscrew engaging means on said pin.

2. In a crawler track assembly: a plurality of track link assemblies, each track link assembly comprising at least one link and connecting means for articulately connecting adjacent track link assemblies, one of said track link assemblies being a master link assembly and comprising a pair of laterally spaced apart master links, each master link comprising a pair of overlapping half-links, said half-links overlapping along a plane, a pin-engaging hole in each half-link, the pin-engaging holes being in registry with each other, a pin extending perpendicular to said plane and engageable with said pin-engageing holes in the half-links in each pair of half-links to effect alignment of said half-links, said pin having capscrew engaging means thereon, a master track shoe overlying said master links and each said pair of half-links, said master track shoe comprising a plurality of capscrew holes, each half-link having at least one capscrew hole in registry with a capscrew hole in said master track shoe, and capscrews for securing said master track shoe to said pair of master links and each pair of half-links and connecting each pair of half-links in fixed relationship to each other and to said master track shoe, each capscrew being disposed in a capscrew hole in said master track shoe and a registering capscrew hole in a half-link, at least one of said capscrews being engaged with said capscrew engaging means on said pin.

3. In a master link assembly for a crawler track assembly: at least one pair of separable half-links disposed in overlapping relationship along a plane to provide a link, each half-link being provided with registering pin-engaging means and a capscrew hole, a removable pin extending perpendicular to said plane and cooperable with said pin-engaging means for interconnecting said pair of half-links against longitudinal relative movement of said half-links in a direction transverse to the pin axis, said pin having capscrew-engaging means thereon, a master track shoe, a plurality of track shoe capscrews engageable with said master track shoe and the capscrew holes in said half-links for releasably securing said master track shoe to each of said half-links to prevent longitudinal and lateral relative movement of said half-links, at least one of said capscrews in each half-link being movable to a fully inserted position in one of said half-links wherein it cooperates with said capscrew-engaging means on said pin to prevent axial displacement of said pin, the said one capscrew in overlapping half-links being further movable to a partially inserted position clear of said capscrew-engaging means on said pin to allow removal of said pin.

4. In a master link assembly for a crawler track assembly: a pair of laterally spaced apart master links, each master link comprising a pair of overlapping half-links, each half-link being provided with a track bushing receiving hole and a pin hole, the pin holes in overlapping half-links being in registry, each half-link being further provided with at least one threaded track shoe capscrew-receiving hole extending thereinto transversely to said pin-receiving hole, a pin extending into the registering pin holes in overlapping half-links, said pin having capscrew engaging means thereon, a master track shoe overlying said pair of master links and provided with a plurality of track shoe capscrew holes therethrough, each track shoe capscrew hole in said master track shoe being in registry with one threaded track shoe capscrew hole in a half-link, and a plurality of track shoe capscrews for securing said master track shoe to said master links and for connecting the overlapping half-links in each pair of master links in fixed relationship to each other and to said master track shoe, each track shoe capscrew extending through a track shoe capscrew hole in said master track shoe and into a registering track shoe capscrew-receiving hole in a half-link, at least one of said capscrews for each pair of overlapping half-links being engaged with said capscrew engaging means on said pin.

5. A master link assembly according to claim 4 wherein each threaded track shoe capscrew-receiving hole in a half-link intersects a portion of the pin hole in the half-link; and wherein said capscrew engaging means on each pin is a groove for accommodating a track shoe capscrew when the latter is fully inserted into the track shoe capscrew-receiving hole in the half-link to enable engagement of the track shoe capscrew and pin and thereby to prevent axial displacement of said pin.

6. A master link assembly according to claim 5 wherein the track shoe capscrews in overlapping half-links, when only partially inserted into the track shoe capscrew-receiving holes in the half-link, are out of engagement with the associated pin thereby enabling the pin to be removed from the aligned pin receiving holes.

7. A master link assembly according to claim 6 wherein each half-link is further provided with a second threaded track shoe capscrew-receiving hole extending thereinto transversely of said pin-receiving hole, wherein said master track shoe is provided with additional track shoe capscrew holes therethrough, each additional track shoe capscrew hole being in alignment with one of said second holes in a half-link, and including additional track shoe capscrews, one for each additional track shoe capscrew hole and its associated second hole.

8. In a crawler track assembly: a plurality of articulately connected track link assemblies, each track link assembly comprising a pair of laterally spaced apart links, a hollow cylindrical track bushing, and a cylindrical track pin disposed within said track bushing, each link being provided with a bushing-receiving hole near one end wherein an end of said track bushing is inserted, each link being provided with a track pin-receiving hole near its other end wherein an end of said track pin is inserted, one of said track link assemblies being a master link assembly and comprising: a pair of laterally spaced apart master links, each master link comprising a pair of overlapping half-links, said half-links overlapping along a plane, a pin-engaging hole in each half-link, the pin-engaging holes being in registry with each other, a pin extending perpendicular to said plane and into said pin-engaging holes for interconnecting each pair of half-links, said pin having capscrew engaging means thereon, a master track shoe overlying said master links and each said pair of half-links, said master track shoe comprising a plurality of capscrew holes, each half-link having at least one capscrew hole in registry with a capscrew hole in said master track shoe, and capscrews for securing said master track shoe to said pair of master links and each pair of half-links and connecting each pair of half-links in fixed relationship to each other and to said master track shoe, each capscrew being disposed in a capscrew hole in said master track shoe and a registering capscrew hole in a half-link, at least one of said capscrews being engaged with said capscrew engaging means on said pin.

9. A crawler track assembly according to claim 8 wherein each half-link in a pair of half-links forming a master link is provided with a pin-receiving hole which registers with the pin-receiving hole in its associated half-link and wherein each pair of registering pin holes accommodates one pin for interconnecting said pair of half-links against longitudinal relative movement of said half-links in a direction transverse to the pin axis.

10. In a crawler track assembly: a plurality of articulately connected track link assemblies, each track link assembly comprising a pair of laterally spaced apart links, a hollow cylindrical track bushing, and a cylindrical track pin disposed within said track bushing, each link being provided with a bushing-receiving hole near one end wherein an end of said track bushing is inserted, each link being provided with a track pin-receiving hole near its other end wherein an end of said track pin is inserted, one of said track link assemblies being a master link assembly and comprising: a pair of laterally spaced apart master links, each master link comprising a pair of overlapping half-links, each half-link in a pair of half-links forming a master link being provided with a pin-receiving hole which registers with the pin-receiving hole in its associated half-link, a pin for interconnecting each pair of half-links, each pair of registering pin holes accommodating one pin for interconnecting said pair of half-links against longitudinal relative movement of said half-links in a direction transverse to the pin axis, said pin having capscrew-engaging means thereon, a master track shoe overlying said master links and each said pair of half-links, said master track shoe comprising a plurality of capscrew holes, each half-link having at least one capscrew hole transversely intersecting the pin-receiving hole in its half-link and in registry with a capscrew hole in said master track shoe, and capscrews for securing said master track shoe to said pair of master links and each pair of half-links and connecting each pair of half-links in fixed relationship to each other and to said master track shoe, each capscrew being disposed in a capscrew hole in said master track shoe and a registering capscrew hole in a half-link, at least one of said capscrews being engaged with said capscrew-engaging means on said pin, the capscrew for said one capscrew hole being movable to a fully inserted position wherein it cooperates with said capscrew-engaging means on said pin to prevent axial displacement of said pin, the capscrew for said one capscrew hole being further movable to a partially inserted position clear of said capscrew-engaging means on said pin to allow removal of said pin.

11. In a master link assembly for a crawler track assembly: a pair of laterally spaced apart master links, each master link comprising a pair of overlapping half-links, each half-link being provided with a track bushing receiving hole and a pin hole, the pin holes in overlapping half-links being in registry, each half-link being further provided with at least one threaded track shoe capscrew-receiving hole extending thereinto transversely to said pin-receiving hole, each threaded track shoe capscrew-receiving hole in a half-link intersecting a portion of the pin hole in the half-link, a pin extending into the registering pin holes in overlapping half-links, each pin being provided with a groove for accommodating a track shoe capscrew, a master track shoe overlying said pair of master links and provided with a plurality of track shoe capscrew holes therethrough, each track shoe capscrew hole in said master track shoe being in registry with one threaded track shoe capscrew hole in a half-link, and a plurality of track shoe capscrews for securing said master track shoe to said master links and for connecting the overlapping half-links in each pair of master links in fixed relationship to each other and to said master track shoe, each track shoe capscrew extending through a track shoe capscrew hole in said master track shoe and into a registering track shoe capscrew-receiving hole in a half link, the latter when fully inserted into the track shoe capscrew-receiving hole in the half-link being in engagement with said pin and to prevent axial displacement of said pin, the track shoe capscrews in overlapping half-links, when only partially inserted into the track shoe capscrew-receiving holes in the half-link being out of engagement with the associated pin thereby enabling the pin to be removed from the aligned pin receiving holes.

12. A master link assembly according to claim 11 wherein each half-link is further provided with a second threaded track shoe capscrew-receiving hole extending thereinto transversely of said pin-receiving hole, wherein said master track shoe is provided with additional track shoe capscrew holes therethrough, each additional track shoe capscrew hole being in alignment with one of said second holes in a half-link, and including additional track shoe capscrews, one for each additional track shoe capscrew hole and its associated second hole.

13. In a crawler track assembly: a plurality of articulately connected track link assemblies, each track link assembly comprising a pair of laterally spaced apart links, a hollow cylindrical track bushing, and a cylindrical track pin disposed within said track bushing, each link being provided with a bushing-receiving hole near one end wherein an end of said track bushing is inserted, each link being provided with a track pin-receiving hole near its other end wherein an end of said track pin is inserted, one of said track link assemblies being a master link assembly and comprising: a pair of laterally spaced apart master links, each master link comprising a pair of overlapping half-links, a pin for interconnecting each pair of half-links, each half-link in a pair of half-links forming a master link being provided with a pin-receiving hole which registers with the pin-receiving hole in its associated half-link and each pair of registering pin holes accommodating one pin for interconnecting said pair of half-links against longitudinal relative movement of said half-links in a direction transverse to the pin axis, each pin having capscrew-engaging means thereon, a master track shoe overlying said master links and each said pair of half-links, said master track shoe comprising a plurality of capscrew holes, each half-link having at least one capscrew hole in registry with a capscrew hole in said master track shoe, at least one capscrew hole in each half-link transversely intersecting the pin-receiving hole in its half-link, and capscrews for securing said master track shoe to said pair of master links and each pair of half-links and connecting each pair of half-links in fixed relationship to each other and to said master track shoe, each capscrew being disposed in a capscrew hole is said master track shoe and a registering capscrew hole in a half-link, the capscrew for said one capscrew hole being movable to a fully inserted position wherein it cooperates with said capscrew-engaging means on said pin to prevent axial displacement of said pin, the capscrew for said one capscrew hole being further movable to a partially inserted position clear of said capscrew-engaging means on said pin to allow removal of said pin.

* * * * *